UNITED STATES PATENT OFFICE.

FOSTER A. BURNINGHAM, GEORGE A. RICHTER, WALLACE B. VAN ARSDEL, AND DONALD H. WHITE, OF BERLIN, NEW HAMPSHIRE, ASSIGNORS TO BROWN COMPANY, OF BERLIN, NEW HAMPSHIRE, A CORPORATION OF MAINE.

WATERPROOF FIBER TUBE AND PROCESS OF MAKING THE SAME.

1,396,021.     Specification of Letters Patent.     Patented Nov. 8, 1921.

No Drawing.     Application filed January 20, 1920. Serial No. 352,874.

*To all whom it may concern:*

Be it known that we, FOSTER A. BURNINGHAM, GEORGE A. RICHTER, WALLACE B. VAN ARSDEL, and DONALD H. WHITE, all citizens of the United States, residing at Berlin, in the county of Coos and State of New Hampshire, have invented new and useful Improvements in Waterproof Fiber Tubes and Processes of Making the Same, of which the following is a specification.

It has heretofore been proposed to manufacture tubes or conduits by coiling wet films or sheets of paper pulp upon a mandrel and then drying the tubes thus formed. Such tubes, being made of paper pulp, while fairly dense, are highly pervious to and absorbent of water, and are, therefore, unadapted without further treatment for use as conduits for liquids of various kinds. Moreover, while fairly strong, nevertheless they require to be stiffened so as to withstand external unbalanced pressures.

The object of the present invention is so to treat such tubes as to render them impervious to moisture and to increase their strength, stiffness and stability.

For this purpose, we employ those phenol-condensation varnishes, such as bakelite and redmanol, which when baked are strong, elastic and insoluble, but which are capable, prior to such heat treatment, of being diluted with suitable solvents.

These varnishes, such as bakelite, when undiluted are thick and viscous, and it is difficult, if not impossible to cause them thoroughly to penetrate and impregnate paper tubes such as herein described; and, on the other hand, when such varnishes are sufficiently diluted with solvents so as to reduce their viscosity to a point at which they will penetrate the interior of and be absorbed by the walls of the tubes, the tubes are porous after they are baked. In the latter case, when the tubes are immersed in water, absorption takes place.

To overcome these difficulties, we fill the pores of the tube with a suitable material, either before or after the impregnation of the tubes with the bakelite solution. Such filling material should be capable of liquefaction, and should harden on cooling or drying. For this purpose, we may employ sulfur or an amorphous water-repellent compound which is free from volatile solvent, such as paraffin or tung oil, or a composition comprising gilsonite, or any other suitable filler which will perform the desired function.

As examples of our process of waterproofing and strengthening fibrous materials, and more particularly paper tubes, we may cite the following.

First. After the tubes have been formed and dried, they are immersed in a bath of molten sulfur (temperature 285° F.) under pressure, until the voids or interstices of the tubes are nearly all filled with the molten sulfur. The tubes are then withdrawn and permitted to cool, so that the sulfur contained in the tubes crystallizes into small particles throughout the walls thereof. The filled tubes are now immersed in a cold bakelite solution (for example, benzol containing 25% bakelite dissolved therein) under pressure until the tubes are thoroughly impregnated therewith, and the fibers thereof (which are not coated with sulfur) are coated with the solution. The tubes are now removed and are dried and baked at a temperature below the melting point of sulfur, say 220° F., for a sufficient time to drive off the solvent and effect the complete polymerization of the bakelite. At the temperature stated, this requires from 24 to 48 hours.

Second. The process recited in the first example may be reversed. That is to say, the tubes may be first impregnated at room temperature and at an elevated pressure, say 80 to 100 pounds, with a solution of 75% benzol and 25% "bakelite varnish No. 1," from 6 to 24 hours. The tubes are withdrawn, and the solvent carefully evaporated by air drying at ordinary temperatures for 24 to 48 hours, and then by moderate heat, e. g. about 130° to 140° F. for 4 to 24 hours. The temperature is now raised to about 260° to 270° F. and the tubes subjected to a pressure of about 60 to 100 pounds applied preferably coincidently with the increase in temperature to complete the polymerization of the bakelite. The tubes are now more or less porous, and are immersed in molten sulfur while subjected to an elevated pressure, until substantially all of the voids or interstices are filled with sulfur, after which the tubes are removed and cooled to permit the sulfur to crystallize.

Third. The tubes are impregnated and treated with bakelite in the manner described in example second. Instead of filling the voids of the tubes with sulfur, the tubes are immersed in an amorphous water-repellent compound, such as paraffin, or a blend of gilsonite and paraffin, or a blend of gilsonite, paraffin and oil, under a pressure of about 80 to 100 pounds and at a temperature of about 280° to 300° F., until the voids and interstices of the tubes are plugged superficially or throughout with the amorphous waterproofing agent, after which the tubes are removed and the agent permitted to cool and set. A coating of the compound may be permitted to remain on the interior and exterior surfaces of the tubes.

Fourth. The tubes may be impregnated and treated with the bakelite solution as recited in the second example, and then immersed in and saturated with tung oil at ordinary room temperatures and under elevated pressures. The impregnated tubes are now removed, and are baked for 24 hours at a temperature of 285°–300° F. until the tung oil is polymerized or baked to an insoluble amorphous varnish which plugs the pores of the tubes.

Fifth. The tubes are treated with the bakelite solution, as in the second example, and then are impregnated under pressure with undiluted bakelite varnish which superficially fills the pores or voids of the tubes. The tubes are again dried and baked. Instead of subjecting the tubes to two bakings, they may be dried after their first impregnation with bakelite solution to cause the evaporation of the solvent, and then impregnated or treated with undiluted "bakelite varnish No. 1," after which they are baked under a pressure of about 60 to 100 pounds, at a temperature of about 260° to 270° F. to complete the polymerization of the bakelite.

While we have specified bakelite in the foregoing examples, we mean by that term to include its equivalent redmanol, our experience showing that, for the purposes desired to be accomplished by us, these two phenol-condensation products function in substantially the same way. Redmanol is soluble in denatured alcohol, and, when it is employed, such alcohol may be employed as the solvent. Other suitable phenol resins, or phenol condensation products in proper solution, may be employed in lieu of those mentioned. Paper tubes, resulting from the practice of the process herein outlined in the several examples, are stiff, durable and capable of withstanding high internal or external pressures. They do not absorb water and show no signs of softening or swelling.

The phenol resin solution apparently coats the individual fibers with films which are strong, elastic and insoluble, whereas the pores or interstices left by the evaporation of the solvent are plugged and filled by a strengthening water-repellent material.

What we claim is:

1. A body of fibrous material having its fibers coated with a polymerized phenol-condensation product, and its pores or interstices plugged or filled with minute crystals of a water-repellent material.

2. A body of fibrous material having its fibers coated with a polymerized phenol-condensation product, and its pores or interstices plugged or filled with sulfur.

3. A paper tube having its fibers coated with a polymerized phenol-condensation product, and its pores or interstices plugged or filled with a water-repellent material.

4. The herein described process of waterproofing fibrous materials, which comprises coating the fibers thereof with a solution containing a phenol-condensation product, baking the same to polymerize said product, and plugging the pores or interstices of said fibrous material with a water-repellent material.

5. The herein described process of waterproofing fibrous materials, which comprises coating the fibers thereof with a solution containing a phenol-condensation product, baking the same to polymerize said product, and plugging the pores of said material with a molten material which sets and hardens on cooling.

6. The herein described process of waterproofing fibrous materials, which comprises coating the fibers thereof with a phenol resin solution, evaporating the solvent and baking such material to polymerize the phenol resin, plugging the pores of said fibrous material with a molten water-repellent material, and causing such water-repellent material to harden and set.

7. The herein described process of waterproofing paper tubes, which comprises impregnating such tubes with molten sulfur and permitting such sulfur to cool and crystallize in the pores or interstices of such tubes, and impregnating the tubes with a solution of a phenol-condensation product, drying the tubes to evaporate the solvent, and baking such tubes to polymerize the phenol-condensation product remaining in the tubes.

In testimony whereof we have affixed our signatures.

FOSTER A. BURNINGHAM.
GEORGE A. RICHTER.
WALLACE B. VAN ARSDEL.
DONALD H. WHITE.